United States Patent
Yarabolu (10) Patent No.: US 12,362,910 B2
(45) Date of Patent: Jul. 15, 2025

(54) SYSTEM AND METHOD FOR IMPLEMENTING SECURE INTERACTION SESSIONS THROUGH DYNAMIC ROUTING PATHS

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 209 days.

(21) Appl. No.: 18/343,910

(22) Filed: Jun. 29, 2023

(65) Prior Publication Data

US 2025/0007695 A1    Jan. 2, 2025

(51) Int. Cl.
*H04L 29/06*     (2006.01)
*H04L 9/06*      (2006.01)

(52) U.S. Cl.
CPC .................................. *H04L 9/0643* (2013.01)

(58) Field of Classification Search
CPC .................................................... H04L 9/0643
See application file for complete search history.

(56) References Cited

U.S. PATENT DOCUMENTS

| | | | |
|---|---|---|---|
| 7,086,086 B2 * | 8/2006 | Ellis | H04L 63/0428 713/153 |
| 8,924,687 B1 | 12/2014 | Frailong et al. | |
| 10,262,102 B2 | 4/2019 | Brown | |
| 10,404,572 B1 | 9/2019 | Fuste Vilella et al. | |
| 10,848,576 B2 | 11/2020 | Stammers et al. | |
| 11,075,837 B2 | 7/2021 | Balasubramanian et al. | |
| 11,194,803 B2 | 12/2021 | Gerard | |
| 11,539,640 B2 | 12/2022 | Zhao et al. | |
| 11,606,225 B2 | 3/2023 | Cidon et al. | |
| 2006/0005014 A1 | 1/2006 | Aura et al. | |
| 2006/0248195 A1 | 11/2006 | Toumura et al. | |
| 2008/0010288 A1 * | 1/2008 | Hinton | H04L 63/0815 |

(Continued)

OTHER PUBLICATIONS

Johnston, Paul. "Authentication and session management on the web." Retrieved Dec. 13, 2004: 2009. (Year: 2004).*

(Continued)

*Primary Examiner* — Shawnchoy Rahman (57) ABSTRACT

A system for implementing secure interaction sessions through dynamic routing paths comprises a processor associated with a server. The processor communicates a traversal key to a communication equipment in response to verifying an authentication token from a communication equipment to implement an interaction session. The traversal key is associated with a routing path that comprises a particular set of entry points for a set of resources. The processor allows the communication equipment to traverse the routing path and generates a traversal path associated with the interaction session. The traversal path identifies the entry points of the set of the resources that are accessed by the communication equipment during the interaction session. The processor generates a second hash value based on a set of ciphers associated with the entry points. The processor completes the interaction session with the communication equipment if the second hash value matches the first hash value.

20 Claims, 4 Drawing Sheets

(56) References Cited

U.S. PATENT DOCUMENTS

| | | |
|---|---|---|
| 2008/0133536 A1 | 6/2008 | Bjorner et al. |
| 2009/0089337 A1 | 4/2009 | Perlin et al. |
| 2011/0099200 A1 | 4/2011 | Blount et al. |
| 2012/0158729 A1 | 6/2012 | Mital et al. |
| 2016/0335299 A1 | 11/2016 | Vemulapati et al. |
| 2017/0180394 A1 | 6/2017 | Crofton et al. |
| 2017/0195221 A1 | 7/2017 | Xiao et al. |
| 2020/0334025 A1 | 10/2020 | Wang et al. |
| 2021/0209092 A1 | 7/2021 | Lee et al. |
| 2023/0308469 A1* | 9/2023 | Warmenhoven ........ H04L 63/20 |
| 2023/0370277 A1* | 11/2023 | Li ....................... H04W 12/106 |

OTHER PUBLICATIONS

Raghavan, Barath, and Alex C. Snoeren. "A system for authenticated policy-compliant routing." Proceedings of the 2004 conference on Applications, technologies, architectures, and protocols for computer communications. 2004. (Year: 2004).*

* cited by examiner

| Authentication Token 162 | Traversal Key 164 | Generated Dt Time | Expiry Dt Time |
|---|---|---|---|
| "Token_C1" | "TravKey_T1" | 12 Mar 23 08:44:51 | 12 Mar 23 08:34:51 |
| "Token_C2" | "TravKey_T2" | 12 Mar 23 15:50:26 | 12 Mar 23 15:40:26 |
| "Token_C3" | "TravKey_T3" | 12 Mar 23 22:42:12 | 12 Mar 23 22:32:12 |
| "Token_C4" | "TravKey_T4" | 12 Mar 23 01:01:54 | 12 Mar 23 00:51:54 |
| "Token_C5" | "TravKey_T5" | 12 Mar 23 15:35:42 | 12 Mar 23 15:25:42 |
| "Token_C6" | "TravKey_T6" | 12 Mar 23 00:29:37 | 12 Mar 23 00:19:37 |
| "Token_C7" | "TravKey_T7" | 12 Mar 23 20:37:39 | 12 Mar 23 20:27:39 |
| "Token_C8" | "TravKey_T8" | 12 Mar 23 20:18:02 | 12 Mar 23 20:08:02 |

| Authentication Token 162 | Traversal Key 164 | Resources 148 (Rn_En) | Ciphers 154 | Request Dt Time |
|---|---|---|---|---|
| "Token_C4" | "TravKey_T4" | "R1_E8" | fE0PDtUwpSOy9UzASiJO | 12 Mar 23 03:29:55 |
| "Token_C4" | "TravKey_T4" | "R2_E1" | dkLmDD6p5HqF9WJOgfPk | 12 Mar 23 10:38:49 |
| "Token_C4" | "TravKey_T4" | "R3_E3" | 7gBYZBGiU65TroRPACxl | 12 Mar 23 04:05:42 |
| "Token_C4" | "TravKey_T4" | "R4_E7" | ZTPENBlEBizKllgjKBZi | 12 Mar 23 06:28:03 |
| "Token_C4" | "TravKey_T4" | "R5_E9" | 6LYkFlujN8esZCCqofm4 | 12 Mar 23 00:18:45 |
| "Token_C4" | "TravKey_T4" | "R6_E0" | KRWQMUClL2bn5878ZYds | 12 Mar 23 04:00:17 |
| "Token_C4" | "TravKey_T4" | "R7_E4" | arO8j8l6NZ1OpY2AuKl3 | 12 Mar 23 11:33:48 |
| "Token_C4" | "TravKey_T4" | "R8_E2" | 4QVQl2ZHDllErfkOYSlS | 12 Mar 23 01:26:54 |

SYSTEM AND METHOD FOR IMPLEMENTING SECURE INTERACTION SESSIONS THROUGH DYNAMIC ROUTING PATHS

TECHNICAL FIELD

The present disclosure relates generally to network communications and information security, and more specifically to a system and method for implementing secure interaction sessions through dynamic routing paths.

BACKGROUND

An interaction session may be established based on token-based authentication between a communication equipment and a server. Such a traditional approach may be susceptible to malicious activities when an authentication token is exposed to an unauthorized third party. For example, it may be used by the unauthorized third party to access secure information stored in the server.

SUMMARY

Current technology is not configured to provide a reliable and efficient solution to authenticate, track and verify an interaction process to implement secure interaction sessions in a network. The system described in the present disclosure is particularly integrated into a practical application and provides technical solutions to implement secure interaction sessions through dynamic routing paths.

In a traditional authentication system, an authentication token may be used to verify a user identifier of an interaction process. If the authentication token is obtained by an unanticipated third party, the system may not be able to track and verify an interaction process for implementing the interaction session securely. The present system addresses this issue by utilizing a resource invocation table including one or more routing paths and allowing communication equipment to traverse a particular routing path associated with an interaction session. In one embodiment, the central server may communicate a traversal key to the communication equipment in response to verifying the authentication token associated with a user identifier. The traversal key is associated with a particular routing path that comprises a particular set of entry points associated with a set of resources for completing the interaction session. The particular routing path includes the set of the entry points with a set of ciphers for accessing corresponding resources. The central server may generate a first hash value for the particular routing path based on the set of the ciphers. The central server may generate a traversal path after the communication equipment completes traversing the particular routing path. The central server may further generate a second hash value associated with the traversal path. When the central server determines that the second hash value matches the first hash value associated with the particular routing path, the central server may complete the interaction session with the communication equipment.

In one embodiment, the system for implementing secure interaction sessions through dynamic routing paths in a network comprises a processor and a memory. The processor receives a request with an authentication token from a communication equipment to implement an interaction session. The communication equipment is associated with a user identifier. The interaction session is associated with a particular set of resources. The processor verifies the authentication token associated with the user identifier. The processor communicates a traversal key to the communication equipment in response to verifying the authentication token. The traversal key is associated with a particular routing path that comprises a particular set of entry points for the particular set of the resources associated with the interaction session. The processor allows the communication equipment to traverse the particular routing path associated with the interaction session. The processor generates a traversal path associated with the interaction session. The traversal path identifies the entry points of the resources that are accessed by the communication equipment during the interaction session. The processor generates a second hash value based on the set of the ciphers associated with the entry points identified by the traversal path. The processor determines whether the second hash value matches the first hash value. In response to determining that the second hash value matches the first hash value, the processor completes the interaction session with the communication equipment.

The system described in the present disclosure provides technical solutions to solve the technical problems of the previous systems. The disclosed system provides a practical application that improves the information security of the computer system by allowing the communication equipment to traverse a particular routing path associated with an interaction session and generating a traversal path to implement the interaction session. The central server may generate a first hash value based on a set of predefined ciphers of a set of entry points for corresponding resources along the particular routing path. The central server may generate a second hash value based on corresponding predefined ciphers associated with the entry points identified by the traversal path. Further, the disclosed system verifies that the second hash value associated with the traversal path matches the first hash value associated with the particular routing path to complete the interaction session. This process provides a technical advantage that increases information security because it provides a fast and effective way to authenticate, track and verify the interaction session securely and dynamically in real time. As such, the disclosed system may provide technical advantages of improving the underlying operations of implementing secure interaction sessions through dynamic routing paths in a computer system.

The disclosed system may further improve information security by preventing the computer system from interaction failures and data loss. Thus, the disclosed processes improve the underlying operation of the computer network system overall.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies fail to provide efficient and reliable solutions to track and verify an interaction process to implement secure interaction sessions in a network. This disclosure presents a system for implementing secure interaction sessions through dynamic routing paths by referring to FIGS. 1-5.

Example System for Predicting Anomalous Interactions in a Network

Figure 1:
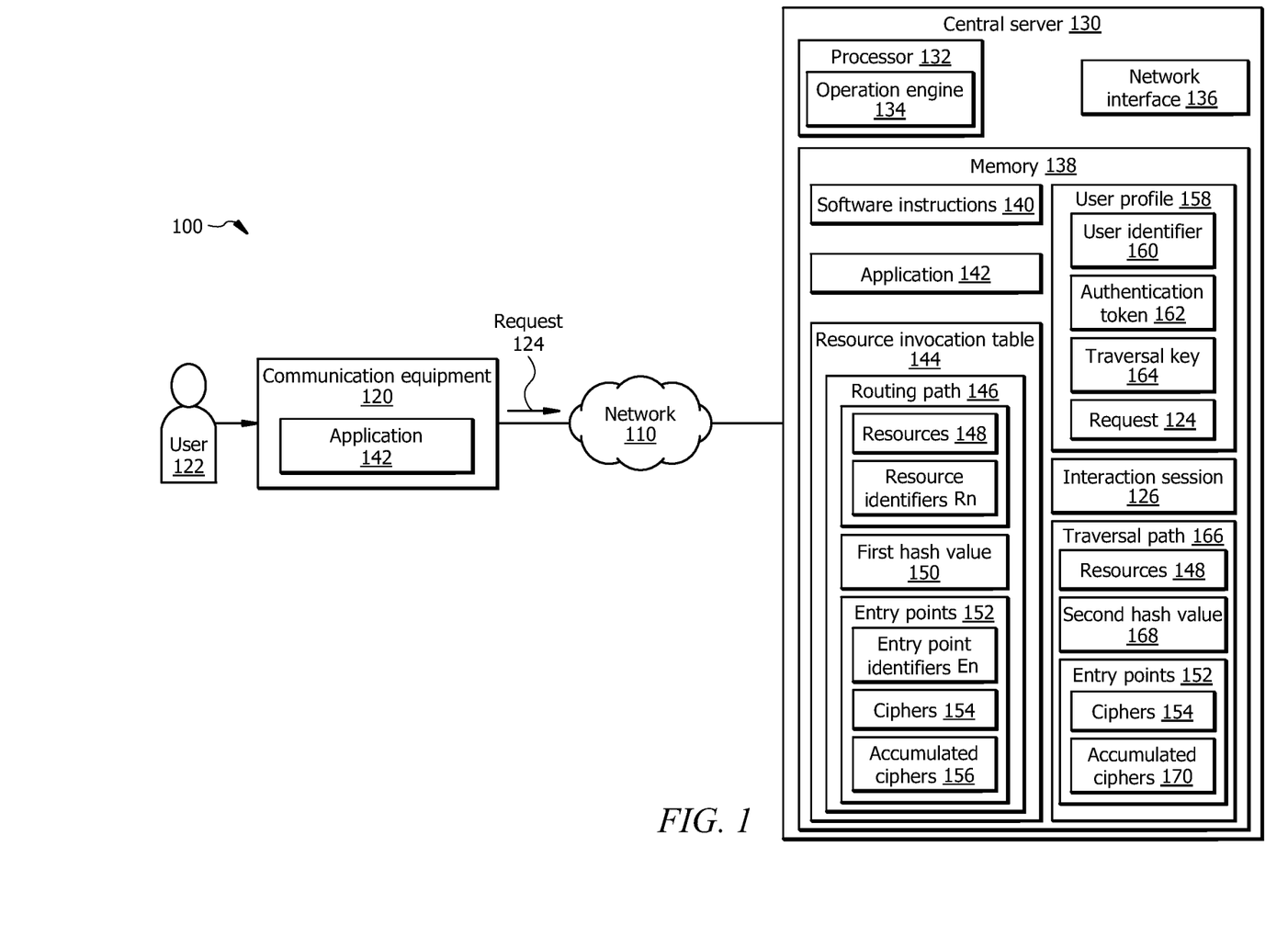
FIG. 1 illustrates an embodiment of a system configured to implement secure interaction sessions through dynamic routing paths.

FIG. 1 illustrates one embodiment of a system 100 that is configured to implement secure interaction sessions 126 through dynamic routing paths in a network 110. In one embodiment, system 100 comprises a central server 130, one or more communication equipment 120, and a network 110. Network 110 enables the communication between components of the system 100. Central server 130 comprises a processor 132 in signal communication with a memory 138. Memory 138 stores software instructions 140 that when executed by the processor 132, cause the processor 132 to perform operations illustrated in FIGS. 1-5. In other embodiments, system 100 may not have all the components listed and/or may have other elements instead of, or in addition to, those listed above.

In some embodiments, the memory 138 stores a resource invocation table 144 with a plurality of routing paths 146 for implementing interaction sessions 126 in response to corresponding requests 124. Each particular routing path 146 comprises a set of entry points 152 for a set of resources 148 associated with an interaction session. For example, the central server 130 may receive a request 124 with an authentication token 162 from a communication equipment 120 to implement an interaction session. The central server 130 may perform user authentication by verifying the authentication token 162 associated with a user identifier 160 and communicating a traversal key 164 to the communication equipment 120. The traversal key 164 is associated with a particular routing path 146 for completing the interaction session. The particular routing path 146 includes the set of the entry points 152 with a set of ciphers 154 for accessing corresponding resources 148. The central server 130 may generate a first hash value 150 for the particular routing path 146 based on the set of the ciphers 154. The communication equipment 120 traverses the particular routing path 146 associated with the interaction session. The central server 130 may generate a traversal path 166 after the communication equipment 120 completes traversing the particular routing path 146. The central server 130 may further generate a second hash value 168 associated with the traversal path 166 associated with the interaction session. The central server 130 may complete the interaction session with the communication equipment 120 when the central server 130 determines that the second hash value 168 associated with the traversal path 166 matches the first hash value 150 associated with the particular routing path 146.

System Components

Network

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Communication Equipment

Communication equipment 120 is generally any device that is configured to process data and interact with users 122. Examples of the communication equipment 120 include, but are not limited to, a personal computer, a desktop computer, a workstation, a server, a laptop, a tablet computer, a mobile phone (such as a smartphone), etc. The communication equipment 120 may include a user interface, such as a display, a microphone, keypad, or other appropriate terminal equipment usable by a user 122. The communication equipment 120 may include a hardware processor, memory, and/or circuitry configured to perform any of the functions or actions of the communication equipment 120 described herein. The hardware processor may include one or more processors operably coupled to the memory. The one or more processors may be any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The one or more processors may be a programmable logic device, a microcontroller, a microprocessor, or any suitable combination of the preceding. The one or more processors are configured to process data and may be implemented in hardware or software. For example, the processor may be 8-bit, 16-bit, 32-bit, 64-bit, or of any other suitable architecture. The processor may include an arithmetic logic unit (ALU) for performing arithmetic and logic operations for performing the functions of the communication equipment 120. An application 142 may be installed on the communication equipment 120. The application 142 may be a user interface software application, mobile application or web application. Application 142 may be accessed by a user 122 through a communication equipment 120 for certain services provide by the central server 130.

Central Server

Central server 130 is generally a server, or any other device configured to process data and communicate with one or more communication equipment 120 via the network 110. The central server 130 is generally configured to oversee the operations of the operation engine 134, as described further below in conjunction with the operational flows of the method 500 described in FIG. 5. The central server 130 may be a server implemented in the cloud and may also be organized in a distributed manner.

Processor 132 comprises one or more processors operably coupled to the memory 138. The processor 132 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations. The processor 132 registers the supply operands to the ALU and stores the results of ALU operations, and a control unit that fetches instructions from the memory 138 and executes them by directing the coordinated operations of the ALU, registers and other components. The one or more processors are configured to implement various instructions. For example, the one or more processors are configured to execute instructions (e.g., software instructions 140) to implement the operation engine 134. In this way, the processor 132 may be a special-purpose computer designed to implement the functions disclosed herein. In one embodiment, the processor 132 is implemented using logic units, FPGAs, ASICs, DSPs, or any other suitable hardware. The processor 132 is configured to operate to perform one or more operations as described in FIGS. 2-5.

Network interface 136 is configured to enable wired and/or wireless communications (e.g., via network 110). The network interface 136 is configured to communicate data between the central server 130 and communication equipment 120, databases, systems, or domains. For example, the network interface 136 may comprise a WIFI interface, a local area network (LAN) interface, a wide area network (WAN) interface, a modem, a switch, or a router. The processor 132 is configured to send and receive data using the network interface 136. The network interface 136 may be configured to use any suitable type of communication protocol as would be appreciated by one of ordinary skill in the art.

Memory 138 may be volatile or non-volatile and may comprise a read-only memory (ROM), random-access memory (RAM), ternary content-addressable memory (TCAM), dynamic random-access memory (DRAM), and static random-access memory (SRAM). Memory 138 may be a non-transitory computer-readable medium implemented using one or more disks, tape drives, solid-state drives, and/or the like. Memory 138 is operable to store the software instructions 140, an application 142, and other program modules to implement operational flows of the system of FIG. 1. The software instructions 140 may store any suitable set of instructions, logic, rules, or code operable to be executed by the processor 132 to implement the processes and embodiments described below. In an example operation, memory 138 may further include a resource invocation table 144, user profile 158, traversal path 166, and/or any other data or instructions. Each user profile 158 may include a user identifier 160, an authentication token 162, and a traversal key 164.

A resource invocation table 144 may include a plurality of routing paths 146. Each routing path 146 may include a set of entry points 152 associated with a set of resources 148, a set of predefined ciphers 154, and a first hash value 150. Each entry point 152 along a routing path 146 is associated with an entry point identifier En, a corresponding resource 148 with a resource identifier Rn, and a unique predefined cipher 154. Each traversal path 166 may include a plurality of resources 148, a second hash value 168, entry points 152 with corresponding ciphers 154 and accumulated ciphers 170. The application 142 may be a user interface application implemented by the central server 130 to receive a request 124 from a communication equipment 120 through the network 110.

In some embodiments, the processor 132 may execute the software instructions 140 to process a request 124 from a user 122 associated with a communication equipment 120 to implement an interaction session associated with a set of resources 148. The processor 132 may execute the software instructions 140 to verify a user identifier 160 and communicate a traversal key 164 associated with a particular routing path 146 to the communication equipment 120 in response to a verification. The processor 132 may execute the software instructions to generate a traversal path 166 associated with the interaction session and a second hash value 168 associated with the traversal path 166. Further, the processor 132 may complete the interaction session with the communication equipment 120 in response to determining that the second hash value 168 associated with the traversal path 166 matches a first hash value 150 associated with the particular routing path 146. The operation of the system 100 is described in FIG. 5 below.

Generate a Traversal Key to Perform Pre-Authentication of a User Identify

Figure 2:
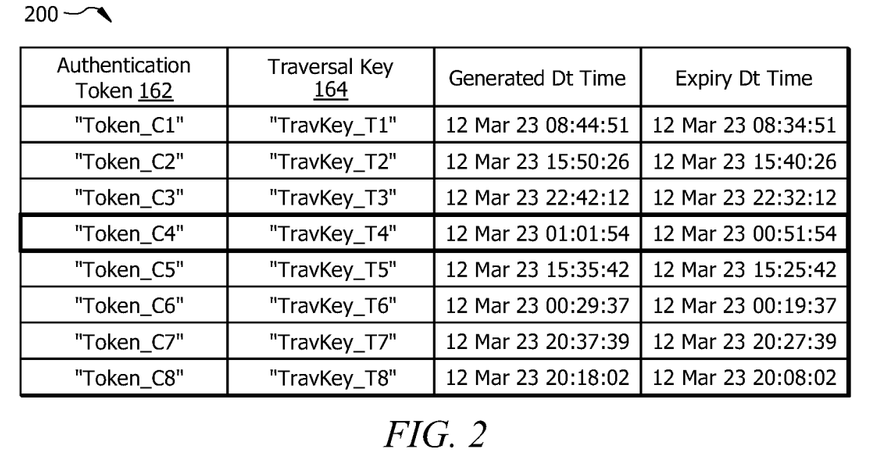
FIG. 2 illustrates an example token table.

In some embodiments, the central server 130 may generate an authentication token 162 to verify a user identity for accessing certain services provided by an entity. The central server 130 may receive a request 124 with the authentication token 162 from a communication equipment 120 associated with a user 122 to implement an interaction session. The central server 130 may perform a verification by determining that the authentication token 162 received from the communication equipment 120 matches the authentication token 162 associated with the user identifier 160 stored in the memory 138. In response to verifying the authentication token 162 associated with the user identifier 160, the central server 130 may communicate a traversal key 164 to the communication equipment 120 and associate the traversal key 164 with the authentication token 162. The central server 130 may generate a token table 200 as illustrated in FIG. 2. The token table 200 stores the authentication token 162 (e.g., "Token_C4" in FIG. 2) associated with the traversal keys 164 ("Travkey_T4" in FIG. 2). The token table 200 may store a timestamp with a date and time (e.g., "Generated DtTime") that each traversal key 164 is generated by the central server 130. The token table 200 may store another timestamp with an expiration date and time (e.g., "Expiry DtTime") of the traversal keys 164.

Figure 3:
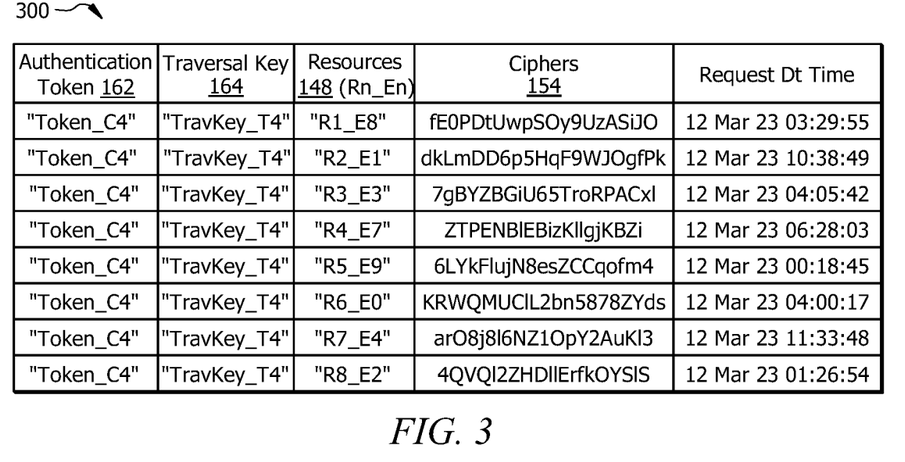
FIG. 3 illustrates an example resource invocation table.

Generate a Resource Invocation Table with Routing Paths for Implementing an Interaction Session In some embodiments, the central server 130 may establish a plurality of routing paths 146 to implement multiple interaction sessions 126 between a plurality of communication equipment 120 and the central server 130 in response to multiple requests 124 from users 122. FIG. 3 illustrates an example resource invocation table 300 that the central server 130 generates to implement interaction sessions 126. As illustrated in FIG. 3, the resource invocation table 300 includes a particular routing path 146 associated with a unique traversal key 164 and an authentication token 162 for implementing an interaction session between the communication equipment 120 and the central server 130. The routing path 146 may include an authentication token 162, a traversal key 164, a set of resources 148 associated with a set of entry points 152, a set of ciphers 154, and corresponding date and time that the central server 130 receives a request 124 for an interaction session 126. Each resource 148 along a particular routing path 146 may include a resource identifier Rn and be associated with an entry point 152. Each resource 148 along a routing path 146 may be represented by a pair of a resource identifier Rn and an entry point identifier En, such as "R1_E8" in the example resource invocation table 300. The central server 130 may define or generate a unique cipher 154 for each entry point 152 to access a corresponding resource 148. In some embodiments, a cipher 154 may be a predefine cipher generated by the central server 130 for each corresponding entry point 152 based on a particular coding rule. In some embodiments, the central server 130 may generate a cipher 154 for an entry point 152 randomly. Each cipher 154 associated with an entry point 152 may include a series of digits and letters which may be configured to be used by the central server 130 to grant access to a resource 148 through a corresponding entry point 152.

Figure 4:
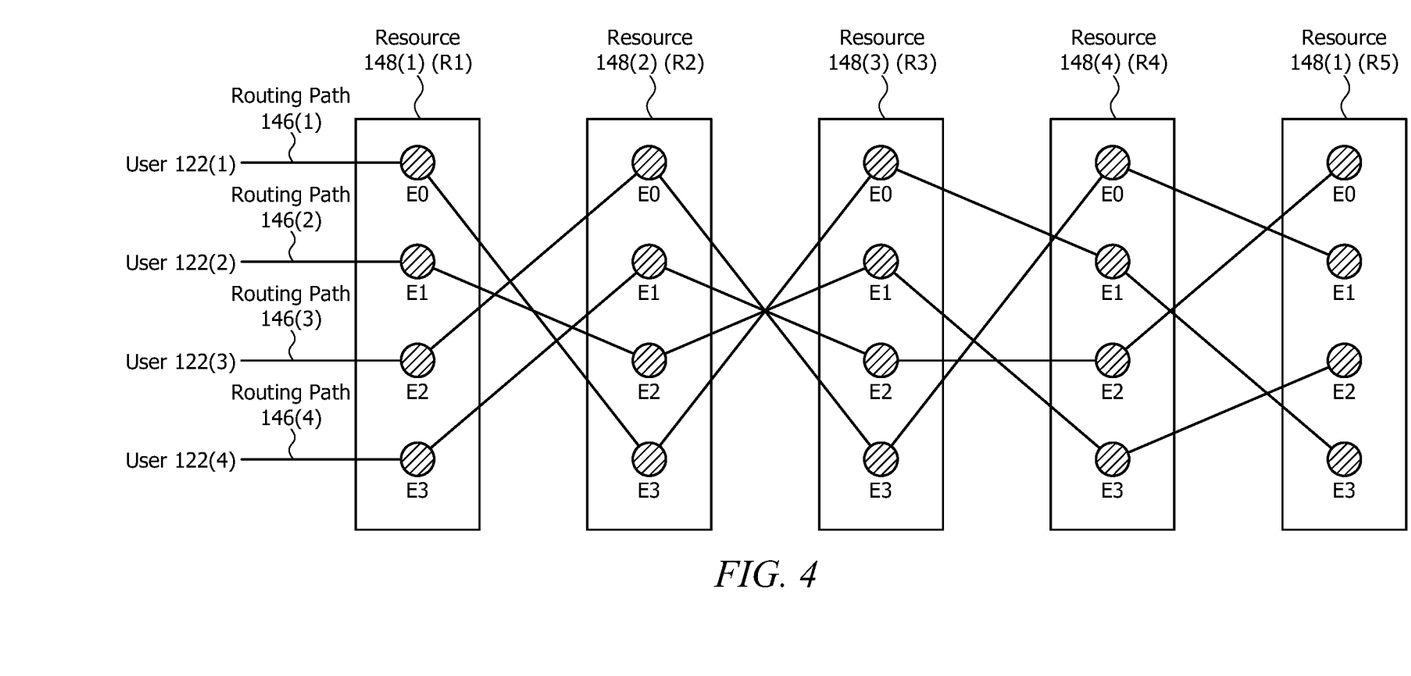
FIG. 4 illustrates an example diagram of a plurality of routing paths.

In some embodiments, the resource invocation table 300 may be configured to include a plurality of routing paths 146. FIG. 4 illustrates an example diagram 400 of a plurality of routing paths 146 [1]-146 [4] that the central server 130 may generate in response to a plurality of requests 124 from different users 122 [1]-122 [4]. Each resource 148 may correspond to a particular executable operation which is required to be implemented by the central server 130 to complete the interaction session 126. Each entry point 152 associated with a resource 148 along each routing path 146 is one of a plurality of entry points 152 represented with entry point E0-E3. Each resource 148 along the routing path 146 may be accessed through one of a set of entry points 152 such as E0-E3 to implement the interaction session 126. For example, the central server 130 may associate a unique traversal key 164 with a routing path 146 [1] which includes a set of the resources 148 [1]-148 [5] (e.g., R1-R5) to implement the interaction session 126 for a user 122 [1].

In some embodiments, the central server 130 may generate a first hash value 150 by applying an operation rule on the set of the ciphers 154 associated with the set of the entry points 152 along the particular routing path 146. The central server 130 may apply an operation rule to generate an original accumulated cipher 156 for each entry point 152 based on each cipher 154 associated with each previous entry point 152 along the particular routing path 146. The operation rules may be an operation such as addition, multiplication, etc.

Generate and Verify a Traversal Path to Implement the Interaction Session

After communicating a traversal key 164 to the communication equipment 120 in response to verifying the authentication token 162, the central server 130 may allow the communication equipment 120 to traverse a routing path 146 associated with the traversal key 164 and interact with the central server 130 for implementing the interaction session 126. The traversal key 164 is associated with a set of cipher 154 for accessing a set of resources 148 through a set of entry points 152. For example, the communication equipment 120 may invoke and access each resource 148 along a particular routing path 146 [1]. The routing path 146 [1] may include a set of sequential entry points 152 (e.g., E0, E3, E0, E1, and E3) for accessing the particular set of the resources 148 [1]-148 [5] at different timestamps.

The central server 130 may determine that the last entry point along the particular routing path is traversed by the communication equipment. After the central server 130 determines that the communication equipment 120 completes traversing the particular routing path 146, the central server 130 may generate a traversal path 166 associated with the interaction session 126 based on one or more interactions between the central server 130 and the communication equipment 120. The traversal path 166 may identify a set of entry points 152 associated with a set of resources 148 that is accessed by the communication equipment 120 during the interaction session 126. The set of entry points 152 corresponds to a set of ciphers 154 for accessing a set of corresponding resources 148 sequentially. In response to identifying the last entry point along the traversal path 166, the central server 130 may apply an operation rule to generate a second hash value 168 based on the set of the ciphers 154 associated with the entry points 152 identified by the traversal path 166.

In some embodiments, when the communication equipment 120 traverses the particular routing path 146, the central server 130 may apply an operation rule to determine a particular accumulated cipher 170 for each entry point 152 identified by the traversal path 166 based on each cipher 154 associated with each previous entry point 152 along the traversal path 166. In some embodiments, the central server 130 may compare each accumulated cipher 170 along the traversal path 166 to an original accumulated cipher 156 along the particular routing path 146 to verify that each resource along the routing path 146 is traversed through an entry point 152 with the corresponding cipher correctly.

The central server 130 may compare a second hash value 168 associated with the traversal path 166 to the first hash value 150 associated with the particular routing path 146 to determine whether the second hash value 168 matches the first hash value 150. In response to determining a match, the central server 130 may complete the interaction session 126 with the communication equipment 120. —The process is described in detail in conjunction with the operational flows of the methods 500 illustrated in FIG. 5.

Figure 5:
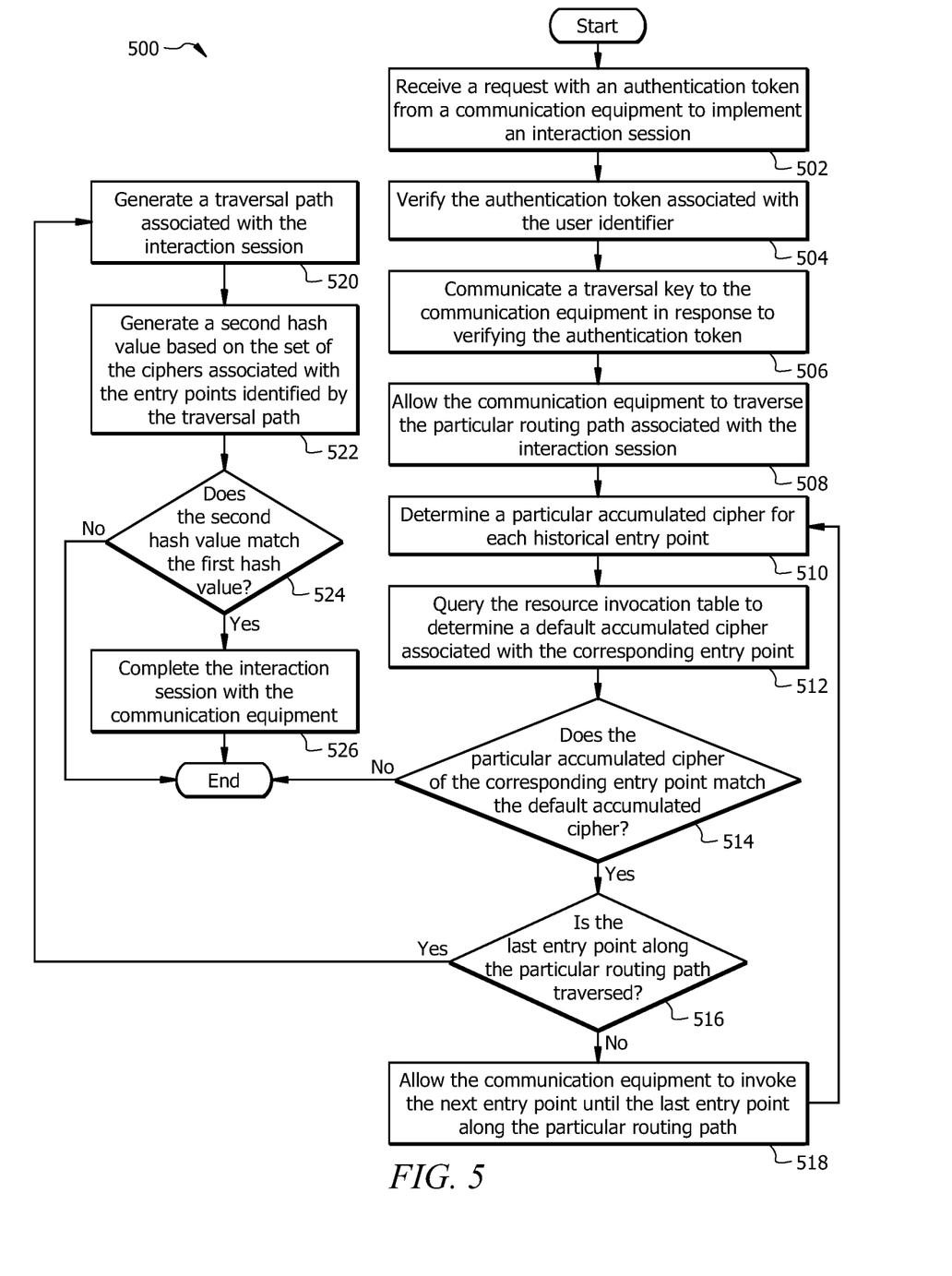
FIG. 5 illustrates an example operational flow of a method for implementing secure interaction sessions through dynamic routing paths.

Example Operational Flow for Implementing Secure Interaction Sessions Through Dynamic Routing Paths FIG. 5 illustrates an example flow of a method 500 for implementing secure interaction sessions 126 through dynamic routing paths in the system 100. Modifications, additions, or omissions may be made to method 500. Method 500 may include more, fewer, or other operations. For example, operations may be performed by the central server 130 in parallel or in any suitable order. While at times discussed as the system 100, processor 132, operation engine 134, or components of any of thereof performing operations, any suitable system or components of the system may perform one or more operations of the method 500. For example, one or more operations of method 500 may be implemented, at least in part, in the form of software instructions 140 of FIG. 1, stored on non-transitory, tangible, computer-readable media (e.g., memory 138 of FIG. 1) that when run by one or more processors (e.g., processor 132 of FIG. 1) may cause the one or more processors to perform operations 502-226.

The operation engine 134 is executed by the processor 132 to implement a plurality of secure interaction sessions 126 through dynamic routing paths 146 in response to different requests 124 from one or more communication equipment 120 in the system 100. The method 500 begins at operation 502 when the processor 132 executes the operation engine 134 to receive a request 124 with an authentication token 162 from a communication equipment 120 to implement an interaction session. The communication equipment 120 is associated with a user identifier 160. The interaction session is associated with a particular set of resources 148 associated with a routing path 146 in a resource invocation table 144.

At operation 504, the central server 130 may verify the authentication token 162 associated with the user identifier 160 in a user profile 158 stored in the memory 138.

At operation 506, the central server 130 may communicate a traversal key 164 to the communication equipment 120 in response to verifying the authentication token 162 associated with the user identifier 160. The traversal key 164 is associated with a particular routing path 146 in the resource invocation table 144. The particular routing path 146 comprises a particular set of entry points 152 for the particular set of the resources 148 associated with the interaction session. The particular routing path 146 further comprises a set of ciphers 154, one or more original accumulated ciphers 156, and a first hash value 150. Each entry point 152 is associated with a corresponding resource 148 and a unique predefined cipher 154 configured to access the corresponding resource 148.

At operation 508, the central server 130 may allow the communication equipment 120 to traverse the particular routing path 146 associated with the interaction session after communicating the traversal key 164 to the communication equipment 120.

At operation 510, the central server 130 may determine a particular accumulated cipher 170 for each entry point 152 based on each corresponding cipher 154 associated with each previous entry point 152 while the communication equipment 120 traverses the particular routing path 146. Each entry point 152 along the particular routing path 146 is traversed by the communication equipment 120 to access a resource 148 during the interaction session.

At operation 512, the central server 130 may query the resource invocation table 300 to determine an original accumulated cipher 156 associated with the corresponding entry point 152 along the routing path 146 which is traversed by the communication equipment 120.

At operation 514, the central server 130 may determine whether the particular accumulated cipher 170 for the corresponding entry point 152 traversed by the communication equipment 120 matches the original accumulated cipher 156 stored in the resource invocation table 144.

At operation 516, in response to determining that the particular accumulated cipher 170 of the corresponding entry point 152 matches the original accumulated cipher 156, the central server 130 may determine whether the corresponding entry point 152 along the particular routing path 146 is the last entry point 152 traversed by the communication equipment 120.

At operation 518, in response to determining that the corresponding entry point 152 along the particular routing path 146 is not the last entry point 152 traversed by the communication equipment 120, the central server 130 may allow the communication equipment 120 to invoke a next entry point 152 to access the resources 148. The process may return to the operations 510-516 until the last entry point 152 along the particular routing path is traversed by the communication equipment 120.

At operation 520, in response to determining that the corresponding entry point 152 along the particular routing path 146 is the last entry point 152 traversed by the communication equipment 120, the central server 130 may generate a traversal path 166 associated with the interaction session. The traversal path 166 identifies the entry points 152 of the resources 148 that are accessed by the communication equipment 120 during the interaction session.

At operation 522, the central server 130 may generate a second hash value 168 based on the set of the ciphers 154 associated with the entry points 152 identified by the traversal path 166.

At operation 524, the central server 130 may determine whether the second hash value 168 associated with the traversal path 166 matches the first hash value 150 associated with the particular routing path 146.

At operation 526, the central server 130 may complete the interaction session with the communication equipment 120 in response to determining that the second hash value 168 associated with the traversal path 166 matches the first hash value 150 associated with the particular routing path 146.

The disclosed system is integrated into a practical application which improves the security and efficiency of the current interaction tracking and verification process by traversing a routing path 146 to generate and verify the traversal path 166 to implement an interaction session.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
a memory operable to store a resource invocation table comprising a plurality of routing paths, wherein each routing path comprises a set of entry points associated with a set of resources, a set of predefined ciphers, and a first hash value, wherein each entry point is associated with a corresponding resource and a unique predefined cipher; and
a processor operably coupled to the memory, the processor configured to:
receive a request with an authentication token from a communication equipment to implement an interaction session, wherein the communication equipment is associated with a user identifier, wherein the interaction session is associated with a particular set of resources;
verify the authentication token associated with the user identifier;
communicate a traversal key to the communication equipment in response to verifying the authentication token, wherein the traversal key is associated with a particular routing path that comprises a particular set of entry points for the particular set of the resources associated with the interaction session;
allow the communication equipment to traverse the particular routing path associated with the interaction session;

generate a traversal path associated with the interaction session, wherein the traversal path identifies a set of entry points of resources that are accessed by the communication equipment during the interaction session;

generate a second hash value based on a set of ciphers associated with the entry points identified by the traversal path;

determine whether the second hash value matches the first hash value; and in response to determining that the second hash value matches the first hash value, complete the interaction session with the communication equipment.

2. The system of claim 1, wherein the processor is further configured to:

generate the first hash value based on the set of the predefine ciphers of the set of the entry points along each routing path; and associate the first hash value with each routing path in the resource invocation table in the memory.

3. The system of claim 1, wherein the processor is further configured to determine a particular accumulated cipher for each entry point identified by the traversal path based on each corresponding cipher associated with each previous entry point along the traversal path.

4. The system of claim 3, wherein the processor is further configured to:

query the resource invocation table to determine a original accumulated cipher associated with the corresponding entry point;

determine whether the particular accumulated cipher of the corresponding entry point matches the original accumulated cipher stored in the resource invocation table; and in response to determining that the particular accumulated cipher matches the original accumulated cipher, allow the communication equipment to invoke a next entry point to access the interaction session associated with the interaction session until the last entry point along the particular routing path is traversed by the communication equipment.

5. The system of claim 4, wherein the processor is further configured to determine the original accumulated cipher for each entry point based on each cipher of one or more previous entry points along each routing path in the resource invocation table.

6. The system of claim 1, wherein each entry point comprises an entry point identifier associated with a corresponding resource in the resource invocation table; wherein each entry point along each routing path is one of a plurality of entry points associated with a resource; and wherein different routing paths in the resource invocation table are associated with different user identifiers.

7. The system of claim 1, wherein the processor is further configured to associate the authentication token and the traversal key with the particular routing path in the resource invocation table in the memory.

8. A method comprising:

receiving a request with an authentication token from a communication equipment to implement an interaction session, wherein the communication equipment is associated with a user identifier, wherein the interaction session is associated with a particular set of resources;

verifying the authentication token associated with the user identifier;

communicating a traversal key to the communication equipment in response to verifying the authentication token, wherein the traversal key is associated with a particular routing path stored in a resource invocation table in a memory, wherein the particular routing path comprises a particular set of entry points associated with a set of resources, a set of predefined ciphers, and a first hash value;

allowing the communication equipment to traverse the particular routing path associated with the interaction session;

generating a traversal path associated with the interaction session, wherein the traversal path identifies a set of entry points of resources that are accessed by the communication equipment during the interaction session;

generating a second hash value based on a set of ciphers associated with a set of entry points identified by the traversal path;

determining whether the second hash value matches the first hash value; and in response to determining that the second hash value matches the first hash value, completing the interaction session with the communication equipment.

9. The method of claim 8, further comprising:

generating the first hash value based on the set of the predefine ciphers of the set of the entry points along each routing path; and associating the first hash value with each routing path in the resource invocation table in the memory.

10. The method of claim 8, further comprising determining a particular accumulated cipher for each entry point identified by the traversal path based on each corresponding cipher associated with each previous entry point along the traversal path.

11. The method of claim 10, further comprising:

querying the resource invocation table to determine a original accumulated cipher associated with each corresponding entry point;

determining whether the particular accumulated cipher of the corresponding entry point matches the original accumulated cipher stored in the resource invocation table; and in response to determining that the particular accumulated cipher matches the original accumulated cipher, allowing the communication equipment to invoke a next entry point to access the interaction session associated with the interaction session until the last entry point along the particular routing path is traversed by the communication equipment.

12. The method of claim 11, further comprising:

determining the original accumulated cipher for each entry point based on each cipher of one or more previous entry points along each routing path in the resource invocation table.

13. The method of claim 8, wherein each entry point comprises an entry point identifier associated with a corresponding resource in the resource invocation table; wherein each entry point along each routing path is one of a plurality of entry points associated with a resource; and wherein different routing paths in the resource invocation table are associated with different user identifiers.

14. The method of claim 8, further comprising: associating the authentication token and the traversal key with the particular routing path in the resource invocation table in the memory.

15. A non-transitory computer-readable medium that stores instructions that when executed by a processor causes the processor to:

receive a request with an authentication token from a communication equipment to implement an interaction session, wherein the communication equipment is associated with a user identifier, wherein the interaction session is associated with a particular set of resources;

verify the authentication token associated with the user identifier;

communicate a traversal key to the communication equipment in response to verifying the authentication token, wherein the traversal key is associated with a particular routing path stored in a resource invocation table in a memory, wherein the particular routing path comprises a particular set of entry points associated with a set of resources, a set of predefined ciphers, and a first hash value;

allow the communication equipment to traverse the particular routing path associated with the interaction session;

generate a traversal path associated with the interaction session, wherein the traversal path identifies a set of entry points of resources that are accessed by the communication equipment during the interaction session;

generate a second hash value based on the set of the ciphers associated with the entry points identified by the traversal path;

determine whether the second hash value matches the first hash value; and in response to determining that the second hash value matches the first hash value, complete the interaction session with the communication equipment.

16. The non-transitory computer-readable medium of claim 15, wherein the instructions when executed by the processor further cause the processor to:

generate the first hash value based on the set of the predefine ciphers of the set of the entry points along each routing path; and associate the first hash value with each routing path in the resource invocation table in the memory.

17. The non-transitory computer-readable medium of claim 15, wherein the instructions when executed by the processor further cause the processor to:

determine a particular accumulated cipher for each entry point identified by the traversal path based on each corresponding cipher associated with each previous entry point along the traversal path; and determine an original accumulated cipher for each entry point based on each cipher of one or more previous entry points along each routing path in the resource invocation table.

18. The non-transitory computer-readable medium of claim 17, wherein the instructions when executed by the processor further cause the processor to:

query the resource invocation table to determine an original accumulated cipher associated with a corresponding entry point associated with a corresponding resource;

determine whether the particular accumulated cipher of the corresponding entry point matches the original accumulated cipher stored in the resource invocation table; and in response to determining that the particular accumulated cipher matches the original accumulated cipher, allow the communication equipment to invoke a next entry point to access the interaction session associated with the interaction session until the last entry point along the particular routing path is traversed by the communication equipment.

19. The non-transitory computer-readable medium of claim 15, wherein the instructions when executed by the processor further cause the processor to associate the authentication token and the traversal key with the particular routing path in the resource invocation table in the memory.

20. The non-transitory computer-readable medium of claim 15, wherein each entry point comprises an entry point identifier associated with a corresponding resource in the resource invocation table; wherein each entry point along each routing path is one of a plurality of entry points associated with a resource; and wherein different routing paths in the resource invocation table are associated with different user identifiers.

* * * * *